(12) United States Patent
Kim et al.

(10) Patent No.: US 9,083,271 B2
(45) Date of Patent: Jul. 14, 2015

(54) MOTOR CONTROL SYSTEM AND METHOD FOR ENVIRONMENTALLY-FRIENDLY VEHICLE

(71) Applicant: Hyundai Motor Company, Seoul (KR)

(72) Inventors: Young Jun Kim, Gyeonggi-do (KR); Seong Yeop Lim, Seoul (KR); Gu Bae Kang, Gyeonggi-do (KR); Jeongwon Rho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 9 days.

(21) Appl. No.: 14/050,682

(22) Filed: Oct. 10, 2013

(65) Prior Publication Data

US 2014/0375239 A1    Dec. 25, 2014

(30) Foreign Application Priority Data

Jun. 25, 2013    (KR) .......................... 10-2013-0073155

(51) Int. Cl.
*H02P 6/10*    (2006.01)
*H02P 27/08*    (2006.01)
*H02P 21/05*    (2006.01)
*H02P 21/06*    (2006.01)

(52) U.S. Cl.
CPC ........ *H02P 6/10* (2013.01); *H02P 21/05* (2013.01); *H02P 21/06* (2013.01)

(58) Field of Classification Search
CPC .................. H02P 6/10; H02P 27/08

USPC ......................... 318/400.23, 400.26
See application file for complete search history.

(56) References Cited

U.S. PATENT DOCUMENTS

| | | | |
|---|---|---|---|
| 6,950,322 B2* | 9/2005 | Ferens | 363/44 |
| 2005/0029982 A1* | 2/2005 | Stancu et al. | 318/801 |
| 2005/0199341 A1* | 9/2005 | Delp et al. | 156/345.24 |
| 2006/0012353 A1* | 1/2006 | Moussaoui | 323/272 |
| 2012/0056569 A1* | 3/2012 | Takamatsu et al. | 318/400.26 |
| 2013/0082636 A1* | 4/2013 | Ohori et al. | 318/723 |

* cited by examiner

*Primary Examiner* — Eduardo Colon Santana
*Assistant Examiner* — Cortez Cook
(74) *Attorney, Agent, or Firm* — Mintz Levin Cohn Ferris Glovsky and Popeo, P.C.; Peter F. Corless (57) ABSTRACT

A motor control system and method are provided for a vehicle that reduces torque ripples due to motor system characteristics while the vehicle is running at ultra-low speed in an electric vehicle running mode. The system includes a current command generator that generates a current command based on a torque command, a motor speed, and a reference voltage. A current controller generates a voltage command based on the current command. A coordinate transformer transforms the voltage command into a 3-phase voltage command by a coordinate transformation and a PWM (pulse width modulation) signal generator generates a switch signal based on the 3-phase voltage command. A PWM inverter generates a 3-phase driving current to drive a motor based on the switch signal and a current control ripple compensator applies a reverse phase harmonic wave to the current controller to reduce a harmonic wave caused by errors generated from the current controller.

6 Claims, 7 Drawing Sheets

FIG. 1

RELATED ART

FIG. 2

RELATED ART

MOTOR CONTROL SYSTEM AND METHOD FOR ENVIRONMENTALLY-FRIENDLY VEHICLE

CROSS-REFERENCE TO RELATED APPLICATION

This application claims priority to and the benefit of Korean Patent Application No. 10-2013-0073155 filed in the Korean Intellectual Property Office on Jun. 25, 2013, the entire contents of which are incorporated herein by reference.

BACKGROUND (a) Field of the Invention

The present invention relates to a motor control system and method for an environmentally-friendly vehicle, and more particularly, to a motor control system and method for an environmentally-friendly vehicle that reduces torque ripples due to characteristics of a motor system while the environmentally-friendly vehicle is running at ultra-low speed in an electric vehicle (EV) running mode.

(b) Description of the Related Art

Figure 1:
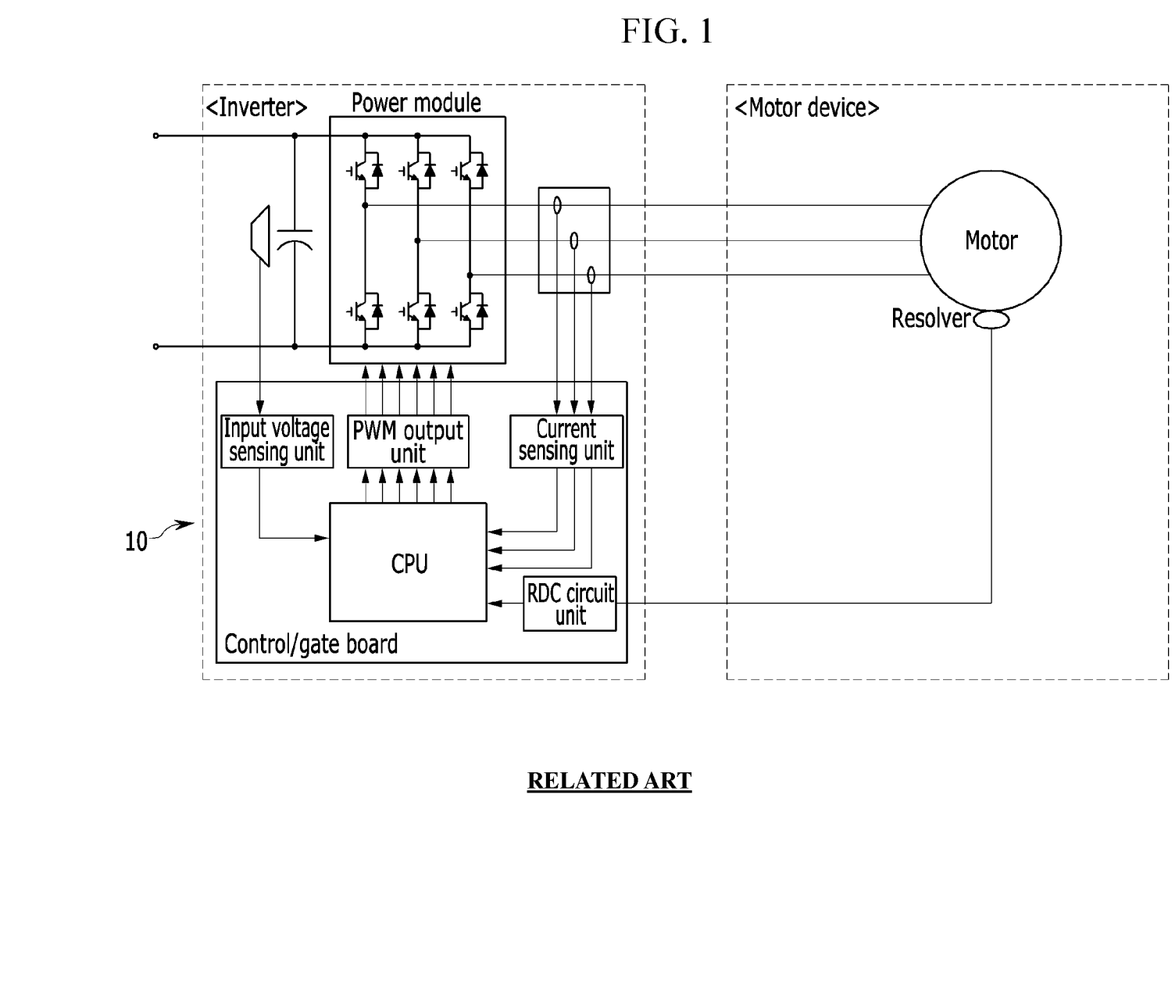
FIG. 1 is an exemplary diagram illustrating a motor system of an environmentally-friendly vehicle according to the related art.

As is well known in the art, environmentally-friendly vehicles, which include a fuel cell vehicle, an electric vehicle, a plug-in electric vehicle, and a hybrid vehicle, typically include one or more motors and engines to generate driving power. The environmentally-friendly vehicles generally include a motor system 10 that has an inverter and a motor device, as shown in FIG. 1.

The inverter of the motor system 10, as a power converter which converts direct current (DC) voltage input from a DC terminal into alternating current (AC) voltage based on a driving condition, may include a control/gate board configured to process input/output signals and a power module formed of power conversion switching devices. The motor device of the motor system 10 is an apparatus that converts electrical energy into mechanical energy to drive the environmentally-friendly vehicle.

Figure 2:
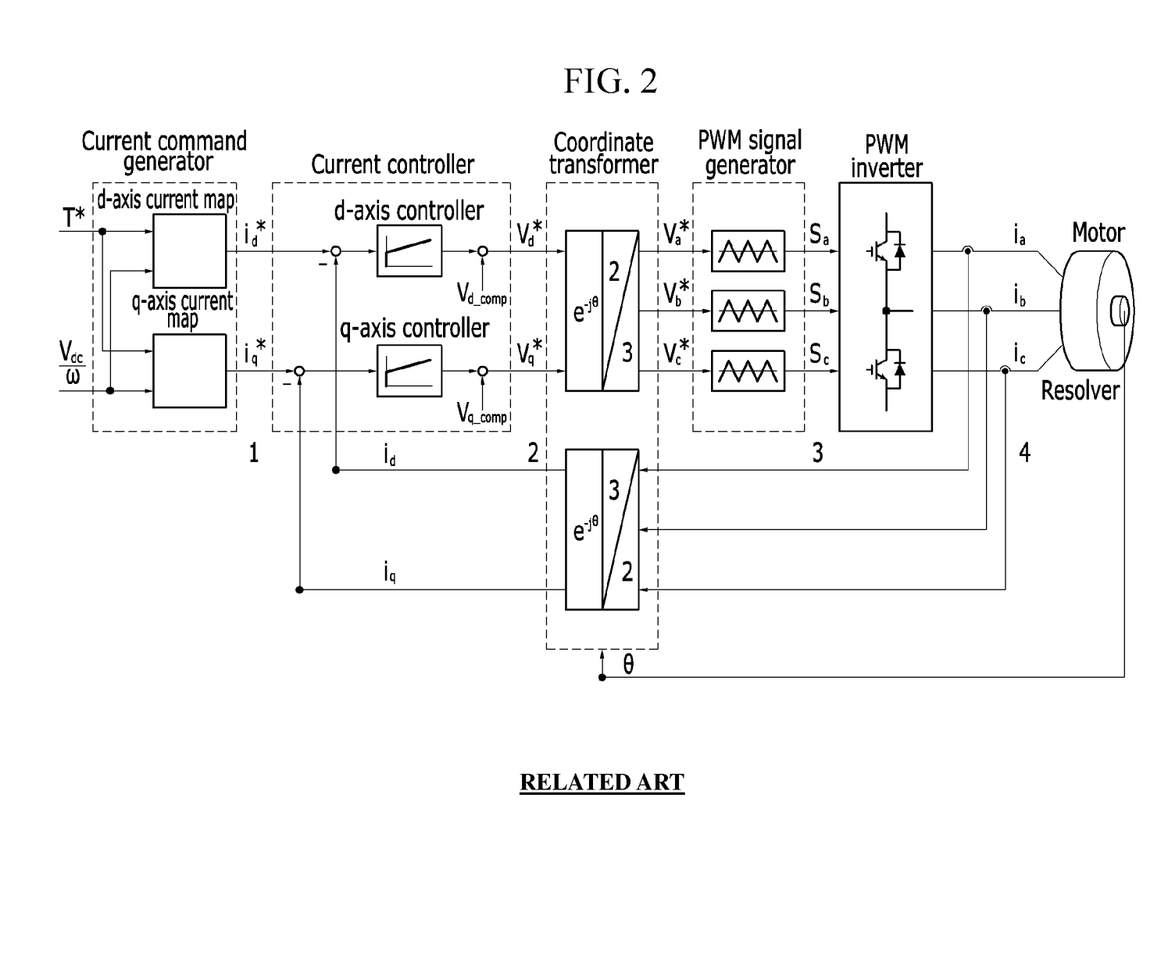
FIG. 2 is an exemplary diagram illustrating a motor control system of an environmentally-friendly vehicle according to the related art.

Furthermore, the motor system 10 is operated by a motor control system, as shown in FIG. 2. The motor control system as shown in FIG. 2 may include a 2-dimensional current command generator, a current controller, a coordinate transformer, a PWM (pulse width modulation) inverter, to operate the motor. The motor control system may sequentially perform operations as follows.

1. The 2-dimensional current command generator of the motor control system may generate a d-axis and q-axis (d/q axis) current command ($i_{dq}^*$) using a torque command ($T^*$), a motor speed ($\omega$), and a reference voltage (Vdc) to be input.

2. The current controller may be configured to generate a d-axis and q-axis (d/q axis) voltage command ($v_{dq}^*$), and the coordinate transformer may transform the d/q axis voltage command ($v_{dq}^*$) into a 3-phase voltage command ($V_{abc}^*$).

3. The PWM signal generator may convert the 3-phase voltage command into a switching signal ($S_{abc}$).

4. When the switching signal is input to the PWM inverter, the PWM inverter may produce 3-phase current ($i_{abc}$) to drive the motor.

However, even though the motor control system may typically operate the motor system of the environmentally-friendly vehicle, when the environmentally-friendly vehicle runs at ultra-low speed in an EV (electric vehicle) mode, surge vibrations may occur, thus drivability may deteriorate. Particularly, when the environmentally-friendly vehicle is driven on a sloped road at ultra-low speed and with high torque, the surge vibrations may occur more than on a level road.

When the surge vibrations occur, since drivability and merchantable quality may decrease, measures to reduce surge vibrations are required. Surge vibrations may occur in the environmentally-friendly vehicle when a frequency of torque ripples based on characteristics of the motor system is resonant with a natural frequency of a driving-transmission apparatus (e.g., a reducer), and conventional methods to compensate for the surge vibrations are as follows.

A method in the prior art reduces torque ripples of the motor system by an optimal design of a motor shape. In particular, the method in the prior art reduces torque ripples by an optimal design for slot and teeth shapes of a motor stator, and by an optimal disposal design for permanent magnets of a rotor of the motor. However, since the method in the prior art needs to have a prototype to perform a verification test, and to repeat related processes when the verification test is unsatisfactory, a considerable amount of time and cost for development are required.

The above information disclosed in this section is only for enhancement of understanding of the background of the invention and therefore it may contain information that does not form the prior art that is already known in this country to a person of ordinary skill in the art.

SUMMARY

The present invention provides a motor control system and method for an environmentally-friendly vehicle that reduces torque ripples of a motor system which causes surge vibrations in the environmentally-friendly vehicle by using a software control method instead of a hardware method such as an optimal design for a motor shape.

In addition, the present invention provides a motor control system for an environmentally-friendly vehicle that analyzes and identifies torque ripples of a motor system which causes surge vibrations at ultra-low speed of an environmentally-friendly vehicle, produces an optimal approximation model for current ripple compensation control using a reaction surface modeling method, and implements reverse phase control for current ripple by the current ripple compensation control.

An exemplary embodiment of the present invention provides a motor control system for an environmentally-friendly vehicle that may include: a current command generator configured to generate a current command based on a torque command, a motor speed, and a reference voltage; a current controller configured to generate a voltage command based on the current command; a coordinate transformer configured to transform the voltage command into a 3-phase voltage command by a coordinate transformation; a PWM (pulse width modulation) signal generator configured to generate a switch signal based on the 3-phase voltage command; a PWM inverter configured to generate a 3-phase driving current to drive a motor based on the switch signal; and a current control ripple compensator configured to apply a reverse phase harmonic wave to the current controller to reduce a harmonic wave caused by errors that are generated from the current controller.

The harmonic wave caused by errors that are generated from the current controller may be a $6^{th}$ harmonic wave. The current control ripple compensator may be configured to use a response surface method (RSM) based on a predetermined test. Independent variables for the RSM may be a torque command, a motor speed, and a reference voltage, and a dependent variable may be a current ripple to be measured. The reverse phase harmonic wave may depend on the following equation:

$$\Delta i^*_{d,6th} = f(T^*, \omega, V_{dc}) \cdot \sin 6\omega t$$

$$\Delta i^*_{q,6th} = g(T^*, \omega, V_{dc}) \cdot \sin 6\omega t$$

wherein $\Delta i^*_{dq,6th}$ is current control ripple compensation value for d/q axis of motor; f( ), g( ) are d/q axis current control ripple compensation approximation model; T* is torque command; $V_{dc}$ is reference voltage; and ω is rotor angular speed As described above, according to an exemplary embodiment of the present invention, it may be possible to reduce torque ripples of a motor system which cause surge vibrations in the environmentally-friendly vehicle using a software control method instead of a hardware method such as an optimal design for a shape of a motor.

Further, according to an exemplary embodiment of the present invention, it may be possible to analyze and identify torque ripples of a motor system which causes surge vibrations at ultra-low speed of an environmentally-friendly vehicle, to produce an optimal approximation model for current ripple compensation control using a reaction surface modeling method, and to implement reverse phase control for current ripple by the current ripple compensation control.

DETAILED DESCRIPTION

Hereinafter, the present invention will be described more fully with reference to the accompanying drawings, in which exemplary embodiments of the invention are shown. The present invention may be modified in various different ways, and is not limited to the exemplary embodiments described herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Moreover, a detailed description of various variables, signs, and constants of equations used in the specification that are apparent to a person having ordinary skill in the art is omitted for the purpose of simplifying the description. Like reference numerals designate like element throughout the specification.

Figure 3:
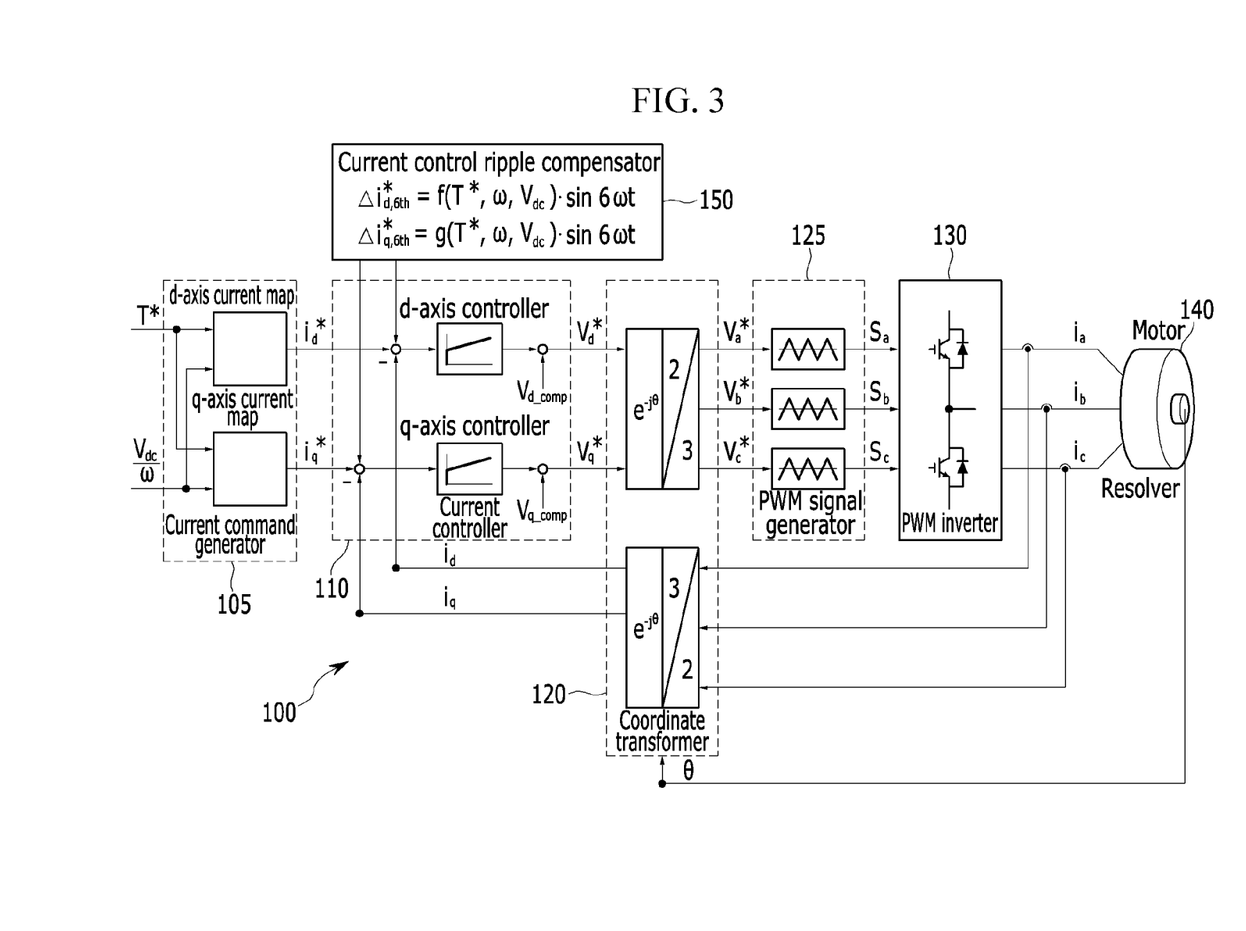
FIG. 3 is an exemplary diagram illustrating a motor control system of an environmentally-friendly vehicle according to an exemplary embodiment of the present invention.

FIG. 3 is an exemplary diagram illustrating a motor control system 100 of an environmentally-friendly vehicle according to an exemplary embodiment of the present invention. The motor control system 100 of the environmentally-friendly vehicle according to an exemplary embodiment of the present invention is a system that may reduce torque ripples which may cause surge vibrations when an environmentally-friendly vehicle runs at ultra-low speed.

The motor control system 100 may include: a current command generator 105 configured to generate a current command based on a torque command, a motor speed, and a reference voltage; a current controller 110 configured to generate a voltage command based on the current command; a coordinate transformer 120 configured to transform the voltage command into a 3-phase voltage command by a coordinate transformation; a PWM (pulse width modulation) signal generator 125 configured to generate a switch signal based on the 3-phase voltage command; a PWM inverter 130 configured to generate a 3-phase driving current to drive a motor 140 based on the switch signal; and a current control ripple compensator 150 configured to apply a reverse phase harmonic wave to the current controller 110 to reduce a harmonic wave caused by errors that are generated from the current controller 110.

Each of the current command generator 105, the current controller 110, the coordinate transformer 120, the PWM signal generator 125, the PWM inverter 130, and the current control ripple compensator 150 included in the motor control system 100 may be one or more processors or microprocessors and/or hardware operated by a predetermined program including a series of commands for executing a motor control algorithm associated with the motor control system according to an exemplary embodiment of the present invention.

The current command generator 105, the current controller 110, the coordinate transformer 120, the PWM signal generator 125, and the PWM inverter 130 may be formed on a one-body control board or on separate control boards which are severally divided. The current command generator 105, the current controller 110, the coordinate transformer 120, the PWM signal generator 125, and the PWM inverter 130 may correspond to those shown in FIG. 2, respectively.

Figure 5:
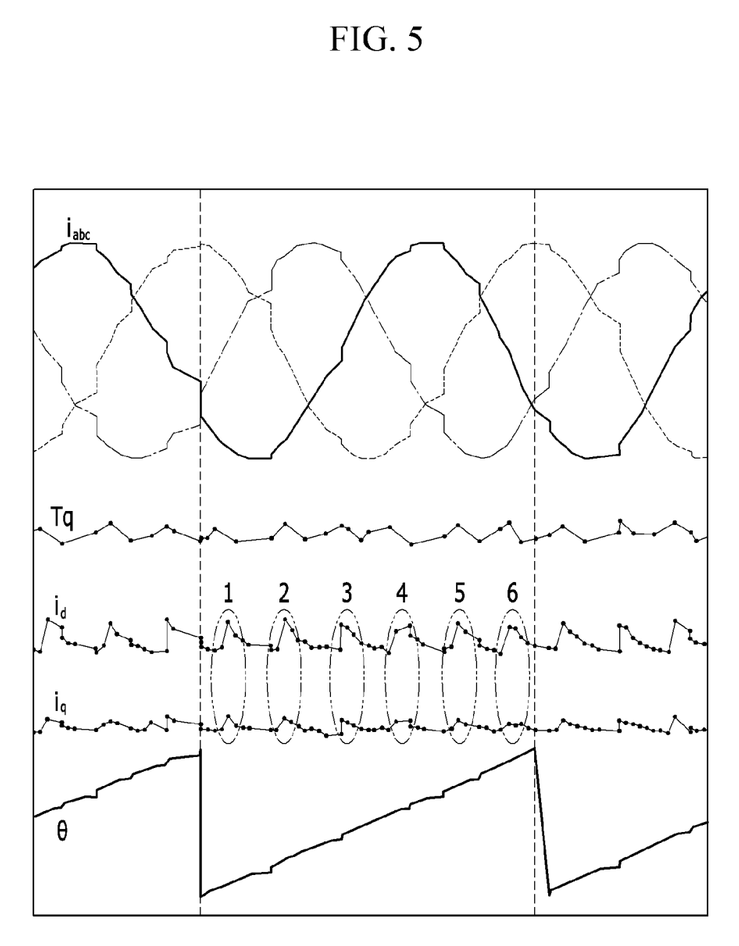
FIG. 5 to FIG. 7 are exemplary graphs illustrating current control ripples, an actual measured wave for a torque ripple, and a FFT (fast Fourier transform) analysis result for a torque ripple occurring in an environmentally-friendly vehicle, respectively according to an exemplary embodiment of the present invention.

Operation of the motor control system will now be described with reference to FIG. 3 to FIG. 7. When operating the motor 140, the torque ripples ($i_d$, $i_q$) may generally be generated by current control errors as shown in FIG. 5. For example, when operating a motor of an environmentally-friendly vehicle, a torque ripple that corresponds to $6^{th}$ harmonic wave for a fundamental wave may be generated as shown in FIG. 5. FIG. 5 shows that current control ripples ($i_d$, $i_q$) from $1^{st}$ to $6^{th}$ per period (θ) of an electric angle are generated, FIG. 6 shows an actual measured wave for the torque ripples, and FIG. 7 shows an FFT analysis result to analyze the torque ripples with FFT.

Figure 4:
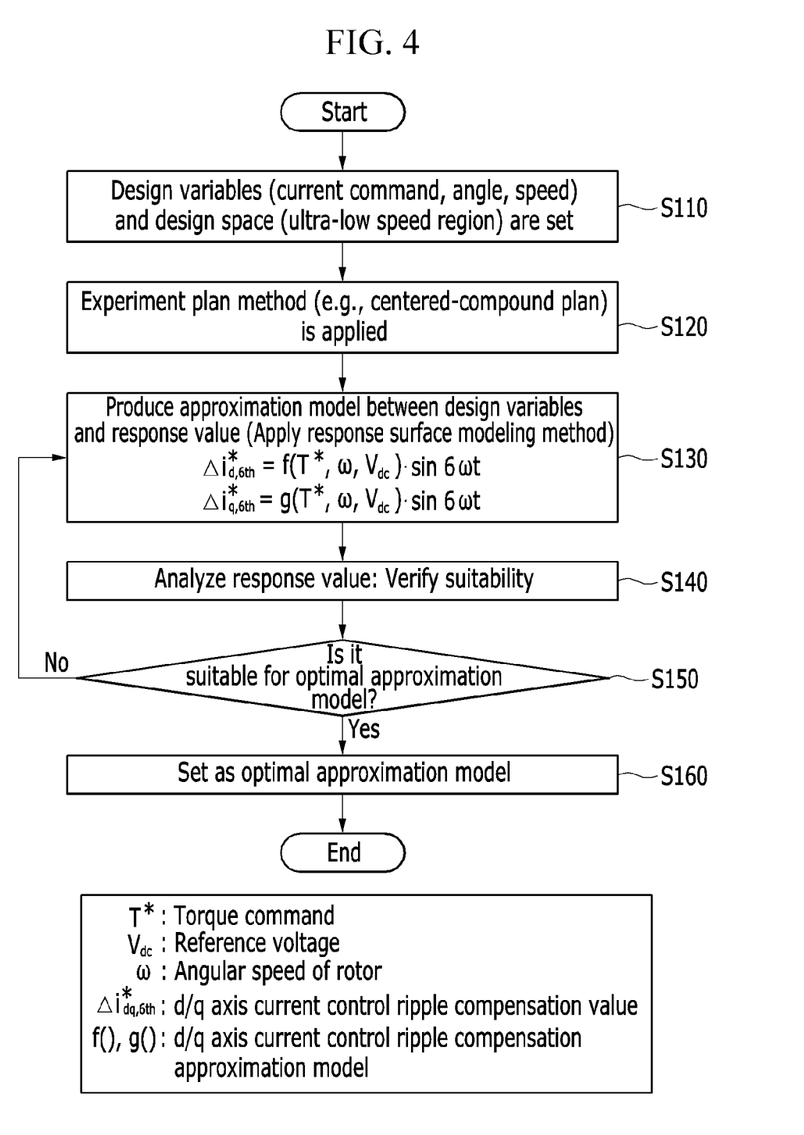
FIG. 4 is an exemplary flowchart for implementing a current control ripple compensator according to an exemplary embodiment of the present invention.
Figure 6:
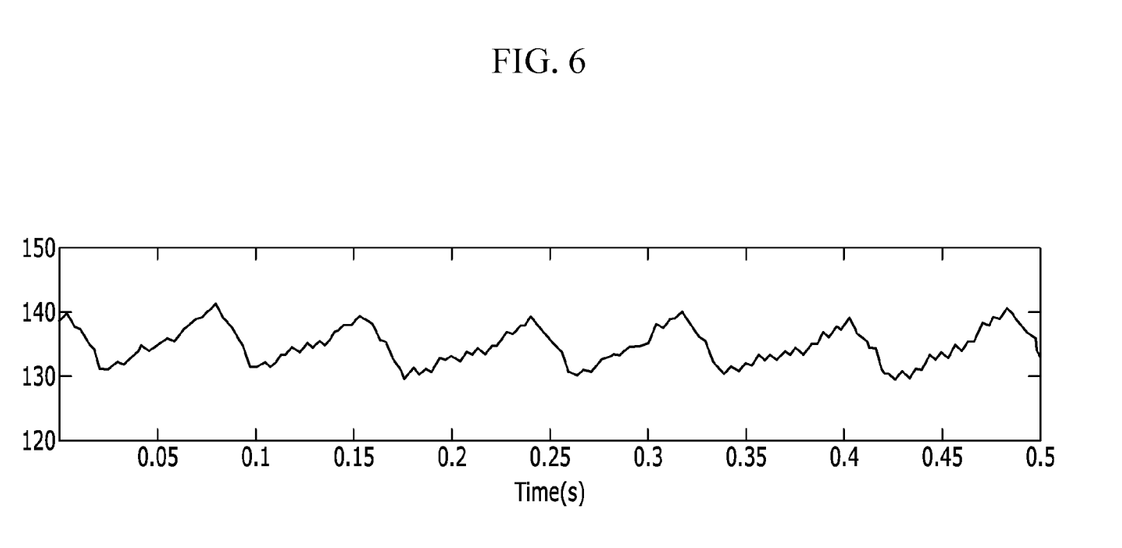
Figure 7:
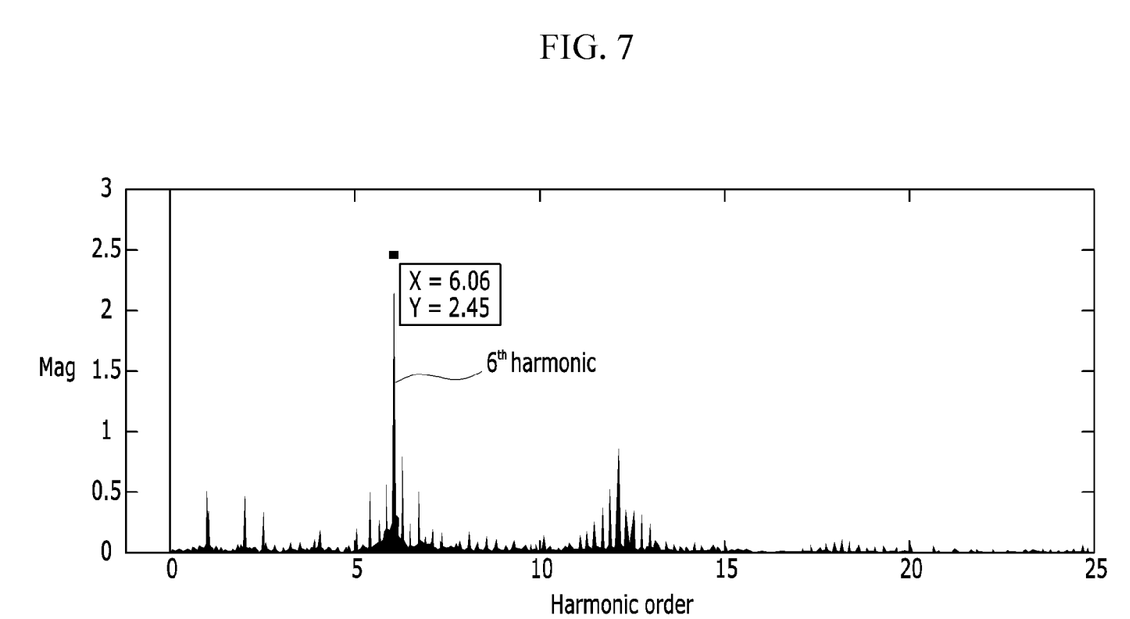

Referring to FIG. 6, it may be possible to identify torque ripple components from $1^{st}$ to $6^{th}$ harmonic wave. Since the motor control system of an exemplary embodiment according to the related art performs current control based on a fundamental wave of current, torque ripple that corresponds to the $6^{th}$ harmonic wave of the current occurs due to the current control errors. Accordingly, the current control ripple compensator 150 of the motor control system 100 may generate a reverse phase signal that may reduce the torque ripple that corresponds to the $6^{th}$ harmonic wave using an approximation model obtained by implementation processes as shown in FIG. 4, and may apply the reverse phase signal to the current controller 110. The reverse phase signal may be a reverse phase signal of the torque ripple.

Referring to FIG. 4, the implementation processes of the current control ripple compensator 150 are as follows.

Firstly, design variables (e.g., current command) and design space (e.g., ultra-low speed region) may be set, and an experiment plan method (e.g., a centered-compound plan) to obtain test data may be applied (S110, S120). The current control ripple compensator 150 may produce an approximation model between design variables and response value based on experimental data obtained based on the experiment plan method (S130). When the approximation model is produced at step S130, the current control ripple compensator 150 may perform dispersion analysis for the response value to verify suitability of the approximation model (S140). When it is determined that the approximation model is suitable as an optimal approximation model by a result of verifying the suitability at step S140, the current control ripple compensator 150 may set the approximation model as an optimal approximation model (S150, S160).

As described above, the torque ripple component that causes surge vibrations in an environmentally-friendly vehicle is the $6^{th}$ harmonic wave component (angular speed standard) caused by current control errors. Accordingly, the current control ripple compensator 150 may generate a reverse phase signal to simultaneously reversely compensate for the $6^{th}$ harmonic wave of current in the current controller 105, and apply the reverse phase signal to the current controller 105.

The current control ripple compensator 150 may produce an optimal approximation model using a response surface modeling method based on an experiment, and equations as follows:

$$\Delta i^*_{d,6th} = f(T^*, \omega, V_{dc}) \cdot \sin 6\omega t$$

$$\Delta i^*_{q,6th} = f(T^*, \omega, V_{dc}) \cdot \sin 6\omega t$$

wherein is $\Delta i^*_{dq,6th}$ is d/q axis current control ripple compensation value of motor; f( ), g( ) are d/q axis current control ripple compensation approximation model; T* is torque command; $V_{dc}$ is reference voltage; and ω is angular speed of rotor.

In addition, when setting an optimal approximation model, the current control ripple compensator 150 may use a linear approximation model equation (a) and/or a linear/squares approximation model equation (b) as follows:

$$\Delta i^*_{d,6th} = f(T^*, \omega, V_{dc}) \cdot \sin 6\omega t = (\alpha_0 + \alpha_1 T^* + \alpha_2 \omega + \alpha_3 V_{dc}) \cdot \sin 6\omega t$$

$$\Delta i^*_{q,6th} = g(T^*, \omega, V_{dc}) \cdot \sin 6\omega t = (\beta_0 + \beta_1 T^* + \beta_2 \omega + \beta_3 V_{dc}) \cdot \sin 6\omega t \qquad \text{Equation (a)}$$

wherein $\alpha_0, \alpha_1, \ldots, \alpha_6, \beta_0, \beta_1, \ldots, \beta_6$ are model coefficients;

$$\Delta i^*_{d,6th} = f(T^*, \omega, V_{dc}) \cdot \sin 6\omega t = (\alpha_0 + \alpha_1 T^* + \alpha_2 \omega + \alpha_3 V_{dc} \alpha_4 T^{*2} + \alpha_5 \omega^2 + \alpha_6 V_{dc}^2) \cdot \sin 6\omega t$$

$$\Delta i^*_{q,6th} = g(T^*, \omega, V_{dc}) \cdot \sin 6\omega t = (\beta_0 + \beta_1 T^* + \beta_2 \omega + \beta_3 V_{dc} \beta_4 T^{*2} + \beta_5 \omega^2 + \beta_6 V_{dc}^2) \cdot \sin 6\omega t \qquad \text{Equation (b)}$$

wherein $\alpha_0, \alpha_1, \ldots, \alpha_6, \beta_0, \beta_1, \ldots, \beta_6$ are model coefficients.

An optimal design using the above-described approximation model may be achieved, for example, by performing approximate optimization processes after substituting an approximation model for an actual model, that is, by reducing a difference between the actual model and the approximation model to converge on an optimal design model (e.g., value).

In an exemplary embodiment of the present invention, a method to set an optimal suitable model that produces a minimum error (e.g., error=actual current ripple−prediction current ripple by model) in a load condition at ultra-low speed may use a dispersion analysis method as a statistical analysis method. The response surface method (RSM) applied to the current control ripple compensator 150, when complex interaction between several explanation variables (e.g., independent variables) influences response variables (e.g., dependent variables), is referred to as a statistical analysis method for response surfaces by changes of the response variables.

The RSM may estimate a function between the independent variables and dependent variables from test result data (e.g., actual measured current), and predict a response amount of the dependent variables based on changes of the independent variables. Independent variables for modeling of the current control ripple compensator 150 may include a torque command, a motor speed, and a reference voltage, and dependent variables may include a current ripple to be measured by an experiment.

The torque command, the motor speed, and the reference voltage are included in independent variables and the current ripple is included in dependent variables since size and phase information (e.g., target object) of ripples are significant in reverse phase compensation for current ripples. Accordingly, ripples of actual measured current which are target objects of compensation control for current ripples may become independent variables (e.g., y components of a function), and the torque command, the motor speed, and the reference voltage that influence the current ripples (e.g., current command) may become independent variables (e.g., x component of a function). For reference, in the related art, the current command generator may be a map type in which the torque command, the motor speed, and the reference voltage are inputted as shown in FIG. 2.

As described above, by using or applying the RSM to the current control ripple compensator 150, the amount of current ripples based on load condition (e.g., torque command at ultra-low speed) of the motor may be predicted more accurately, a compensation model based on test data may be implemented more easily, and an appropriate approximation response model may be produced from a minimum number of tests since the test data is measured based on a test plan.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

| Description of Symbols | |
|---|---|
| 100: Motor control system | 105: Current command generator |
| 110: Current controller | 120: Coordinate transformer |
| 125: PWM signal generator | 130: PWM inverter |

What is claimed is:

1. A motor control system for a vehicle, comprising:
a current command generator configured to generate a current command based on a torque command, a motor speed, and a reference voltage;
a current controller configured to generate a voltage command based on the current command;
a coordinate transformer configured to transform the voltage command into a 3-phase voltage command by a coordinate transformation;
a pulse width modulation (PWM) signal generator configured to generate a switch signal based on the 3-phase voltage command;
a PWM inverter configured to generate a 3-phase driving current to drive a motor based on the switch signal; and
a current control ripple compensator configured to apply a reverse phase harmonic wave to the current controller to reduce a harmonic wave caused by errors that are generated from the current controller,
wherein the harmonic wave caused by errors that are generated from the current controller is a $6^{th}$ harmonic wave,
wherein the current control ripple compensator is configured to use a response surface method(RSM) based on a predetermined test, and
wherein independent variables for the response surface method (RSM) are torque command, a motor speed, and a reference voltage, and a dependent variable is a current ripple to be measured.

2. A motor control system for a vehicle, comprising:
a current command generator configured to generate a current command based on a torque command, a motor speed, and a reference voltage;
a current controller configured to generate a voltage command based on the current command;
a coordinate transformer configured to transform the voltage command into a 3-phase voltage command by a coordinate transformation;
a pulse width modulation (PWM) signal generator configured to generate a switch signal based on the 3-phase voltage command;
a PWM inverter configured to generate a 3-phase driving current to drive a motor based on the switch signal; and
a current control ripple compensator configured to apply a reverse phase harmonic wave to the current controller to reduce a harmonic wave caused by errors that are generated from the current controller
wherein the reverse phase harmonic wave depends on the following equation:

$$\Delta i^*_{d,6th} = f(T^*, \omega, V_{dc}) \cdot \sin 6\omega t$$

$$\Delta i^*_{q,6th} = g(T^*, \omega, V_{dc}) \cdot \sin 6\omega t$$

wherein $\Delta i^*_{dq,6th}$ is a current control ripple compensation value for a d/q axis of a motor,
f( ) and g( ) are d and q axis current control ripple compensation approximation models,
T* is a torque command,
$V_{dc}$ is a reference voltage, and
ω is a rotor angular speed.

3. A motor control method, comprising:
generating, by a processor, a current command based on a torque command, a motor speed, and a reference voltage;
generating, by the processor, a voltage command based on the current command;
transforming, by the processor, the voltage command into a 3-phase voltage command by a coordinate transformation;
generating, by the processor, a switch signal based on the 3-phase voltage command;
generating, by the processor, a 3-phase driving current to drive a motor based on the switch signal;
applying, by the processor, a reverse phase harmonic wave to reduce a harmonic wave caused by generated errors; and
using, by the processor, a response surface method (RSM) based on a predetermined test
wherein the harmonic wave caused by errors that are generated is a $6^{th}$ harmonic wave, and
wherein independent variables for the response surface method (RSM) are torque command, a motor speed, and a reference voltage, and a dependent variable is a current ripple to be measured.

4. A motor control method comprising;
generating, by a processor, a current command based on a torque command, a motor speed, and a reference voltage;
generating, by the processor, a voltage command based on the current command;
transforming, by the processor, the voltage command into a 3-phase voltage command by a coordinate transformation;
generating, by the processor, a switch signal based on the 3-phase voltage command;
generating, by the processor, a 3-phase driving current to drive a motor based on the switch signal; and
applying, by the processor, a reverse phase harmonic wave to reduce a harmonic wave caused by generated errors;
Wherein the reverse phase harmonic wave deoends on the following equation:

$$\Delta i^*_{d,6th} = f(T^*, \omega, V_{dc}) \cdot \sin 6\omega t$$

$$\Delta i^*_{q,6th} = g(T^*, \omega, V_{dc}) \cdot \sin 6\omega t$$

wherein $\Delta i^*_{dq,6th}$ is a current control ripple compensation value for a d/q axis of a motor, f( ) and g( ) are d and q axis current control ripple compensation approximation models, T* is a torque command, $V_{dc}$ is a reference voltage, and ω is a rotor angular speed.

5. A non-transitory computer readable medium containing program instructions executed by a controller, the computer readable medium comprising:

program instructions that generate a current command based on a torque command, a motor speed, and a reference voltage;

program instructions that generate a voltage command based on the current command;

program instructions that transform the voltage command into a 3-phase voltage command by a coordinate transformation;

program instructions that generate a switch signal based on the 3-phase voltage command;

program instructions that generate a 3-phase driving current to drive a motor based on the switch signal;

program instructions that apply a reverse phase harmonic wave to reduce a harmonic wave caused by generated errors; and program instructions that use a response surface method (RSM) based on a predetermined test, wherein the harmonic wave caused by errors that are generated is a $6^{th}$ harmonic wave, and wherein independent variables for the response surface method (RSM) are torque command, a motor speed, and a reference voltage, and a dependent variable is a current ripple to be measured.

6. A non-transitory computer readable medium containing program instructions executed by a controller, the computer readable medium comprising:

program instructions that generate a current command based on a torque command, a motor speed, and a reference voltage;

program instructions that generate a voltage command based on the current command;

program instructions that transform the voltage command into a 3-phase voltage command by a coordinate transformation;

program instructions that generate a switch signal based on the 3-phase voltage command;

program instructions that generate a 3-phase driving current to drive a motor based on the switch signal;

program instructions that apply a reverse phase harmonic wave to reduce a harmonic wave caused by generated errors, wherein the reverse phase harmonic wave depends on the following equation:

$$\Delta i^*_{d,6th} = f(T^*, \omega, V_{dc}) \cdot \sin 6\omega t$$

$$\Delta i^*_{q,6th} = g(T^*, \omega, V_{dc}) \cdot \sin 6\omega t$$

wherein $\Delta i^*_{dq,6th}$ is a current control ripple compensation value for a d/q axis of a motor, f( ) and g( ) are d and q axis current control ripple compensation approximation models, T* is a torque command, $V_{dc}$ is a reference voltage, and ω is a rotor angular speed.

* * * * *